United States Patent
Busaba et al.

(10) Patent No.: US 10,223,154 B2
(45) Date of Patent: *Mar. 5, 2019

(54) HINT INSTRUCTION FOR MANAGING TRANSACTIONAL ABORTS IN TRANSACTIONAL MEMORY COMPUTING ENVIRONMENTS

(71) Applicant: International Business Machines Corporation, Armonk, NY (US)

(72) Inventors: Fadi Y. Busaba, Poughkeepsie, NY (US); Harold W. Cain, III, Raleigh, NC (US); Dan F. Greiner, San Jose, CA (US); Michael Karl Gschwind, Chappaqua, NY (US); Maged M. Michael, Danbury, CT (US); Valentina Salapura, Chappaqua, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,023

(22) Filed: May 3, 2016

(65) Prior Publication Data
US 2016/0246642 A1 Aug. 25, 2016

Related U.S. Application Data

(63) Continuation of application No. 14/191,522, filed on Feb. 27, 2014, now Pat. No. 9,361,041.

(51) Int. Cl.
*G06F 9/46* (2006.01)
*G06F 3/06* (2006.01)
(Continued)

(52) U.S. Cl.
CPC ............ *G06F 9/467* (2013.01); *G06F 3/0619* (2013.01); *G06F 3/0653* (2013.01);
(Continued)

(58) Field of Classification Search
None
See application file for complete search history.

(56) References Cited

U.S. PATENT DOCUMENTS

| 5,504,900 A | 4/1996 | Raz |
| 5,524,241 A | 6/1996 | Ghoneimy et al. |

(Continued)

OTHER PUBLICATIONS

Barros et al., "Software transactional memory as a building block for parallel embedded real-time systems", 2011, 37th EUROMICRO Conference on Software Engineering and Advanced Applications, pp. 251-255.

(Continued)

*Primary Examiner* — Scott C Sun
(74) *Attorney, Agent, or Firm* — Robert J. Shatto

(57) ABSTRACT

When executed, a transaction-hint instruction specifies a transaction-count-to-completion (CTC) value for a transaction. The CTC value indicates how far a transaction is from completion. The CTC may be a number of instructions to completion or an amount of time to completion. The CTC value is adjusted as the transaction progresses. When a disruptive event associated with inducing transactional aborts, such as an interrupt or a conflicting memory access, is identified while processing the transaction, processing of the disruptive event is deferred if the adjusted CTC value satisfies deferral criteria. If the adjusted CTC value does not satisfy deferral criteria, the transaction is aborted and the disruptive event is processed.

20 Claims, 9 Drawing Sheets

(51) Int. Cl.
*G06F 9/48* (2006.01)
*G06F 13/24* (2006.01)
*G06F 9/26* (2006.01)
*G06F 9/52* (2006.01)
*G06F 9/50* (2006.01)
*G06F 9/54* (2006.01)
*G06F 13/38* (2006.01)

(52) U.S. Cl.
CPC ............ *G06F 3/0685* (2013.01); *G06F 9/268* (2013.01); *G06F 9/4881* (2013.01); *G06F 9/5083* (2013.01); *G06F 9/528* (2013.01); *G06F 9/542* (2013.01); *G06F 13/24* (2013.01)

(56) References Cited

U.S. PATENT DOCUMENTS

| | | |
|---|---|---|
| 5,586,297 A | 12/1996 | Bryg et al. |
| 6,327,700 B1 | 12/2001 | Chen et al. |
| 6,349,361 B1 | 2/2002 | Altman et al. |
| 7,234,076 B2 | 6/2007 | Daynes et al. |
| 7,587,615 B2 | 9/2009 | McKenney |
| 7,627,723 B1 | 12/2009 | Buck et al. |
| 7,685,347 B2 | 3/2010 | Gibbs |
| 7,694,094 B2 | 4/2010 | Sepe et al. |
| 7,716,181 B2 | 5/2010 | Todd |
| 7,805,577 B1 | 9/2010 | Mattina et al. |
| 7,899,966 B2 | 3/2011 | Kulkarni |
| 7,930,694 B2 | 4/2011 | Anderson et al. |
| 7,966,459 B2 | 6/2011 | Nussbaum et al. |
| 7,966,495 B2 | 6/2011 | Ackerman et al. |
| 7,996,595 B2 | 8/2011 | Wolfe |
| 8,032,711 B2 | 10/2011 | Black et al. |
| 8,074,030 B1 | 12/2011 | Moir et al. |
| 8,095,824 B2 | 1/2012 | Gray et al. |
| 8,131,894 B2 | 3/2012 | Cain, III et al. |
| 8,229,907 B2 | 7/2012 | Gray et al. |
| 8,234,431 B2 | 7/2012 | Kruglick |
| 8,244,988 B2 | 8/2012 | Cantin et al. |
| 8,291,379 B2 | 10/2012 | Krauss et al. |
| 8,327,188 B2 | 12/2012 | Karlsson et al. |
| 8,375,175 B2 | 2/2013 | Dice et al. |
| 9,244,781 B2 | 1/2016 | Cain, III et al. |
| 9,244,782 B2 | 1/2016 | Cain, III et al. |
| 9,262,206 B2 | 2/2016 | Cain, III et al. |
| 9,262,207 B2 | 2/2016 | Cain, III et al. |
| 9,311,178 B2 | 4/2016 | Busaba et al. |
| 9,329,946 B2 | 5/2016 | Cain, III et al. |
| 9,336,097 B2 | 5/2016 | Cain, III et al. |
| 9,342,397 B2 | 5/2016 | Busaba et al. |
| 9,361,041 B2 | 6/2016 | Busaba et al. |
| 9,389,802 B2 | 7/2016 | Busaba et al. |
| 9,411,729 B2 | 8/2016 | Cain, III et al. |
| 9,424,072 B2 | 8/2016 | Busaba et al. |
| 9,430,273 B2 | 8/2016 | Bradbury et al. |
| 9,442,775 B2 | 9/2016 | Cain, III et al. |
| 9,442,776 B2 | 9/2016 | Cain, III et al. |
| 9,442,853 B2 | 9/2016 | Cain, III et al. |
| 9,448,836 B2 | 9/2016 | Busaba et al. |
| 9,454,483 B2 | 9/2016 | Cain, III et al. |
| 9,465,673 B2 | 10/2016 | Shum et al. |
| 9,471,371 B2 | 10/2016 | Busaba et al. |
| 9,524,187 B2 | 12/2016 | Bradbury et al. |
| 9,524,195 B2 | 12/2016 | Gschwind et al. |
| 9,524,196 B2 | 12/2016 | Gschwind et al. |
| 9,547,595 B2 | 1/2017 | Cain, III et al. |
| 9,575,890 B2 | 2/2017 | Busaba et al. |
| 9,639,415 B2 | 5/2017 | Busaba et al. |
| 9,645,879 B2 | 5/2017 | Busaba et al. |
| 9,753,764 B2 | 9/2017 | Busaba et al. |
| 9,830,185 B2 | 11/2017 | Bradbury et al. |
| 9,846,593 B2 | 12/2017 | Bradbury et al. |
| 9,852,014 B2 | 12/2017 | Shum et al. |
| 9,904,572 B2 | 2/2018 | Busaba et al. |
| 2004/0044850 A1 | 3/2004 | George et al. |
| 2004/0243511 A1 | 12/2004 | Grossman |
| 2005/0086446 A1 | 4/2005 | McKenney et al. |
| 2007/0028056 A1 | 2/2007 | Harris |
| 2007/0186085 A1* | 8/2007 | Yim .................... G06F 9/4812 712/244 |
| 2008/0052466 A1 | 2/2008 | Zulauf |
| 2009/0133032 A1 | 5/2009 | Biles et al. |
| 2009/0183159 A1 | 7/2009 | Michael et al. |
| 2009/0327556 A1 | 12/2009 | Railing et al. |
| 2010/0162045 A1 | 6/2010 | Russ et al. |
| 2010/0169623 A1 | 7/2010 | Dice |
| 2010/0169870 A1 | 7/2010 | Dice |
| 2010/0205408 A1 | 8/2010 | Chung et al. |
| 2010/0233707 A1 | 9/2010 | Buckingham |
| 2010/0235587 A1 | 9/2010 | Noel |
| 2011/0016470 A1 | 1/2011 | Cain, III et al. |
| 2011/0119452 A1 | 5/2011 | Heller, Jr. |
| 2011/0119528 A1 | 5/2011 | Karlsson et al. |
| 2011/0125973 A1 | 5/2011 | Lev et al. |
| 2011/0145498 A1 | 6/2011 | Taillefer et al. |
| 2011/0167222 A1* | 7/2011 | Lee .................... G06F 9/3004 711/118 |
| 2011/0208921 A1 | 8/2011 | Pohlack et al. |
| 2011/0214016 A1 | 9/2011 | Gschwind |
| 2011/0225376 A1 | 9/2011 | Hasting et al. |
| 2011/0246724 A1 | 10/2011 | Marathe et al. |
| 2011/0252203 A1 | 10/2011 | Kottapalli et al. |
| 2011/0296114 A1 | 12/2011 | Farrell et al. |
| 2011/0296148 A1 | 12/2011 | Cain, III et al. |
| 2012/0005461 A1 | 1/2012 | Moir et al. |
| 2012/0084477 A1 | 4/2012 | Arndt et al. |
| 2012/0117334 A1 | 5/2012 | Sheaffer et al. |
| 2012/0144172 A1 | 6/2012 | de Cesare et al. |
| 2012/0179877 A1 | 7/2012 | Shriraman et al. |
| 2012/0233411 A1 | 9/2012 | Pohlack et al. |
| 2012/0254846 A1 | 10/2012 | Moir et al. |
| 2012/0311273 A1 | 12/2012 | Marathe et al. |
| 2013/0013899 A1 | 1/2013 | Barton et al. |
| 2013/0042094 A1 | 2/2013 | Heller, Jr. |
| 2013/0046947 A1 | 2/2013 | Adl-Tabatabai et al. |
| 2013/0311835 A1 | 11/2013 | Dunne et al. |
| 2013/0339330 A1 | 12/2013 | Belmar et al. |
| 2015/0169358 A1* | 6/2015 | Busaba ................ G06F 9/467 711/150 |
| 2015/0242208 A1 | 8/2015 | Busaba et al. |
| 2015/0242214 A1 | 8/2015 | Busaba et al. |
| 2015/0242215 A1 | 8/2015 | Bradbury et al. |
| 2015/0242216 A1 | 8/2015 | Busaba et al. |
| 2015/0242218 A1 | 8/2015 | Shum et al. |
| 2015/0242246 A1 | 8/2015 | Gschwind et al. |
| 2015/0242248 A1 | 8/2015 | Busaba et al. |
| 2015/0242249 A1 | 8/2015 | Cain, III et al. |
| 2015/0242276 A1 | 8/2015 | Cain, III et al. |
| 2015/0242277 A1 | 8/2015 | Cain, III et al. |
| 2015/0242278 A1 | 8/2015 | Cain, III et al. |
| 2015/0242280 A1 | 8/2015 | Busaba et al. |
| 2015/0242307 A1 | 8/2015 | Busaba et al. |
| 2015/0242344 A1 | 8/2015 | Greiner et al. |
| 2015/0242347 A1 | 8/2015 | Bradbury et al. |
| 2015/0248311 A1 | 9/2015 | Bradbury et al. |
| 2015/0355937 A1 | 12/2015 | Bradbury et al. |
| 2015/0363223 A1 | 12/2015 | Bradbury et al. |
| 2015/0363243 A1 | 12/2015 | Gschwind et al. |
| 2015/0370506 A1 | 12/2015 | Busaba et al. |
| 2015/0370614 A1 | 12/2015 | Busaba et al. |
| 2015/0378792 A1 | 12/2015 | Shum et al. |
| 2015/0378943 A1 | 12/2015 | Greiner et al. |
| 2015/0378945 A1 | 12/2015 | Bradbury et al. |
| 2016/0004556 A1 | 1/2016 | Busaba et al. |
| 2016/0004558 A1 | 1/2016 | Busaba et al. |
| 2016/0004573 A1 | 1/2016 | Cain, III et al. |
| 2016/0004589 A1 | 1/2016 | Busaba et al. |
| 2016/0004590 A1 | 1/2016 | Busaba et al. |
| 2016/0004640 A1 | 1/2016 | Cain, III et al. |
| 2016/0004641 A1 | 1/2016 | Cain, III et al. |
| 2016/0004643 A1 | 1/2016 | Gschwind et al. |
| 2016/0246654 A1 | 8/2016 | Busaba et al. |
| 2016/0350174 A1 | 12/2016 | Cain, III et al. |

(56) References Cited

U.S. PATENT DOCUMENTS

2016/0357596 A1    12/2016   Busaba et al.
2018/0060115 A1    3/2018    Busaba et al.
2018/0074847 A1    3/2018    Busaba et al.

OTHER PUBLICATIONS

Mohamedin, "ByteSTM: Java Software Transactional Memory at the Virtual Machine Level", Thesis submitted to the Faculty of Virginia Polytechnic Institute and State University, 2012, pp. 1-78.
Proceedings 2012 IEEE/ACM 45th International Symposium on Microarchitecture MICRO-45, presented Dec. 1-5, 2012, "Transactional Memory Architecture and Implementation for IBM System z", pp. 25-36.
IBM, "Principles of Operation", Tenth Edition (Sep. 2012), SA22-7832-09, 1568 pages.
"Intel® Architecture Instruction Set Extensions Programming Reference", 319433-012A, Feb. 2012, 604 pages.
McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.
Mak et al., IBM J. Res. & Dev. vol. 53, No. 1, Paper 2, 2009, "IBM System z10 Processor Cache Subsystem Microarchitecture", pp. 2:1-2:12.
Mentis et al., "Model checking and code generation for transaction processing software", Department of Informatics, Aristotle University of Thessaloniki, pp. 1-17, 2009.
Chung et al., "Analysis on Semantic Transactional Memory Footprint for Hardware Transactional Memory", 2010 IEEE, 11 pages.
Chung et al., "Tradeoffs in Transactional Memory Virtualization", Proceedings of the 12th International Conference on Architectural Support for Programming Languages and Operating Systems, Oct. 21-25, 2006, pp. 371-381.
Rajwar et al., "Speculative Lock Elision: Enabling Highly Concurrent Multithreaded Execution," Appears in the Proc. of the 34th International Symposium on Microarchitecture (MICRO), Dec. 3-5, 2001, Austin, TX, 12 pages.
Usui et al., "Adaptive Locks: Combining Transactions and Locks for Efficient Concurrency," Journal of Parallel and Distributed Computing, 70(10), Oct. 2010, pp. 1009-1023.
U.S. Appl. No. 14/052,960, filed Oct. 14, 2013, Abandoned Nov. 15, 2013, "Adaptive Process for Data Sharing With Selection of Lock Elision and Locking".
Maldonado et al., "Deadline-Aware Scheduling for Software Transactional Memory", Dependable Systems & Networks (DSN), 2011 IEEE/IFIP 41st International Conference, Jun. 27-30, 2011, pp. 257-268.
León et al., "Fail-safe PVM: A portable package for distributed programming with transparent recovery", pp. 1-22, Feb. 1993, School of Computer Science, Carnegie Mellon University, Pittsburgh, PA 15213.
IBM, "A conflict-hinted method for thread scheduling optimization in transactional memory system," IP.com No. IPC0M000174228D, Sep. 3, 2008, 14 pages.
Moir, "Hybrid Transactional Memory", Sun Microsystems, Inc., Jul. 2005, pp. 1-15, <https:www.sunlabs.com/scalable/pubs/Moir-Hybrid-2005.pdf>.
Pohlack et al., "From Lightweight Hardware Transactional Memory to Lightweight Lock Elision", Advanced Micro Devices, Inc., 2011, 7 pages.
Carlstrom et al., "Transactional Collection Classes", PPoPP'07, Mar. 14-17, 2007, ACM, 12 pages.
Choi et al., "Conflict Avoidance Scheduling Using Grouping List for Transaction Memory", 2012 IEEE 26th Parallel and Distributed Processing Symposium Workshops & PhD Forum (IPDPSW), May 21-25, 2012, pp. 547-556.
Ramadan et al., "Meta TM/TxLinux: Transactional Memory for an Operating System", ISCA '07, Jun. 9-13, 2007, San Diego, CA, ACM, 12 pages.
Disclosed Anonymously, "A Novel Squash Recovery Mechanism in Transactional Memory System", IP.com, IPCOM000196579D, Jun. 7, 2010, 3 pages.
Cain III, et al, "Salvaging Hardware Transactions," U.S. Appl. No. 15/067,264, filed Mar. 11, 2016.
Cain III, et al, "Salvaging Hardware Transactions," U.S. Appl. No. 15/067,491, filed Mar. 11, 2016.

* cited by examiner

HINT INSTRUCTION FOR MANAGING TRANSACTIONAL ABORTS IN TRANSACTIONAL MEMORY COMPUTING ENVIRONMENTS

BACKGROUND

This disclosure relates generally to transaction processing in a multi-processor computing environment with transactional memory, and more specifically to using a transaction-hint instruction for managing transactional aborts in a transactional memory computing environment.

The number of central processing unit (CPU) cores on a chip and the number of CPU cores connected to a shared memory continue to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation of the executing transaction on a memory location conflicts with another operation on the same memory location. Previously, software transactional memory implementations have been proposed to support software Transactional Memory (TM). However, hardware TM can provide improved performance aspects and ease of use over software TM.

U.S. Patent Application Publication No. 2011/0145498 titled "Instrumentation of Hardware Assisted Transactional Memory System" filed 2009 Dec. 15, incorporated herein by reference in its entirety, teaches monitoring performance of one or more architecturally significant processor caches coupled to a processor. The methods include executing an application on one or more processors coupled to one or more architecturally significant processor caches, where the application utilizes the architecturally significant portions of the architecturally significant processor caches. The methods further include at least one of generating metrics related to performance of the architecturally significant processor caches; implementing one or more debug exceptions related to performance of the architecturally significant processor caches; or implementing one or more transactional breakpoints related to performance of the architecturally significant processor caches as a result of utilizing the architecturally significant portions of the architecturally significant processor caches.

U.S. Patent Application Publication No. 2011/0119452 titled "Hybrid Transactional Memory System (Hybrid TM) and Method" filed 2009 Nov. 16, incorporated herein by reference in its entirety, teaches a computer processing system having memory and processing facilities for processing data with a computer program that is a Hybrid Transactional Memory multiprocessor system with modules 1 . . . n coupled to a system physical memory array, I/O devices via a high speed interconnection element. A CPU is integrated as in a multi-chip module with microprocessors which contain or are coupled in the CPU module to an assist thread facility, as well as a memory controller, cache controllers, cache memory, and other components which form part of the CPU which connects to the high speed interconnect which functions under the architecture and operating system to interconnect elements of the computer system with physical memory, various I/O devices, and the other CPUs of the system. The hybrid transactional memory elements support for a transactional memory system that has a simple/cost effective hardware design that can deal with limited hardware resources, yet one which has a transactional facility control logic providing for a back up assist thread that can still allow transactions to reference existing libraries and allows programmers to include calls to existing software libraries inside of their transactions, and which will not make a user code use a second lock based solution.

SUMMARY

Disclosed herein are embodiments of a method for processing transactions in a computing environment with transactional memory. A transaction-hint instruction associated with a first transaction is executed in the computing environment. The transaction-hint instruction specifies a transaction-count-to-completion (CTC) value. The CTC value indicates how far the first transaction is from completion. In some embodiments, the transaction-hint instruction is an instructions-to-completion instruction and the CTC value indicates the approximate number of instructions remaining to complete the first transaction. In some embodiments, the transaction-hint instruction is a transaction-time-to-completion instruction and the CTC value indicates the approximate amount of time remaining to complete the first transaction. In some embodiments, the transaction-hint instruction is a generic transaction-hint instruction and the CTC value may indicate either the approximate number of instructions or the approximate amount of time remaining to complete the first transaction.

The CTC value specified by the transaction-hint instruction is adjusted based on the progression of the first transaction. When a disruptive event associated with inducing transactional aborts is identified while processing the first transaction, such as a pending asynchronous interrupt or a conflicting memory access between the first transaction and a second processor, processing of the disruptive event is deferred based on determining that the adjusted CTC value satisfies deferral criteria.

Also disclosed herein are embodiments of a computer system with a memory and a processor in communication with the memory. The computer system is configured to perform the method described above. Also disclosed herein are embodiments of a computer program product with a computer readable storage medium readable by a processing circuit and storing instructions for execution by the processing circuit. The instructions are for performing the method described above.

BRIEF DESCRIPTION OF THE SEVERAL VIEWS OF THE DRAWINGS

One or more aspects of the present disclosed embodiments are particularly pointed out and distinctly claimed as examples in the claims at the conclusion of the specification. The foregoing and other objects, features, and advantages of the disclosed embodiments are apparent from the following detailed description taken in conjunction with the accompanying drawings in which:

DETAILED DESCRIPTION

Figure 1:
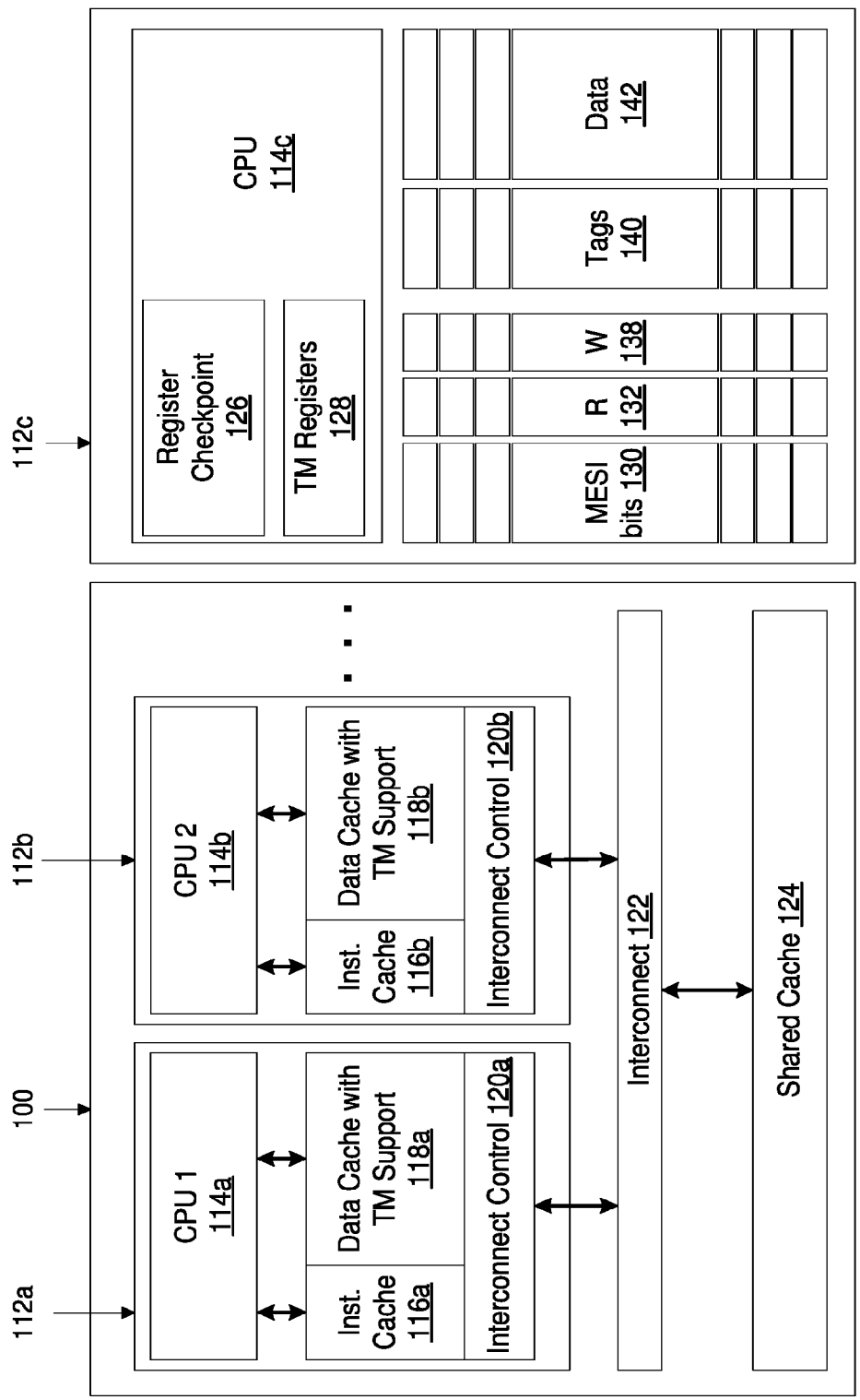
FIG. 1 depicts an example multicore Transactional Memory environment, in accordance with embodiments of the present disclosure.

Historically, a computer system or processor had only a single processor (also known as processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged in a single semiconductor chip or die; such a processor was referred to as a microprocessor. Then processors were developed that incorporated multiple IPUs; such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor that provided the virtual machine with multiple "virtual processors" (also known as processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction performed within the transactional region visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31:24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing aborts when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT

CPUID

PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation-specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIG. 1 depicts an example of a multicore TM environment. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 116b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

Figure 2:
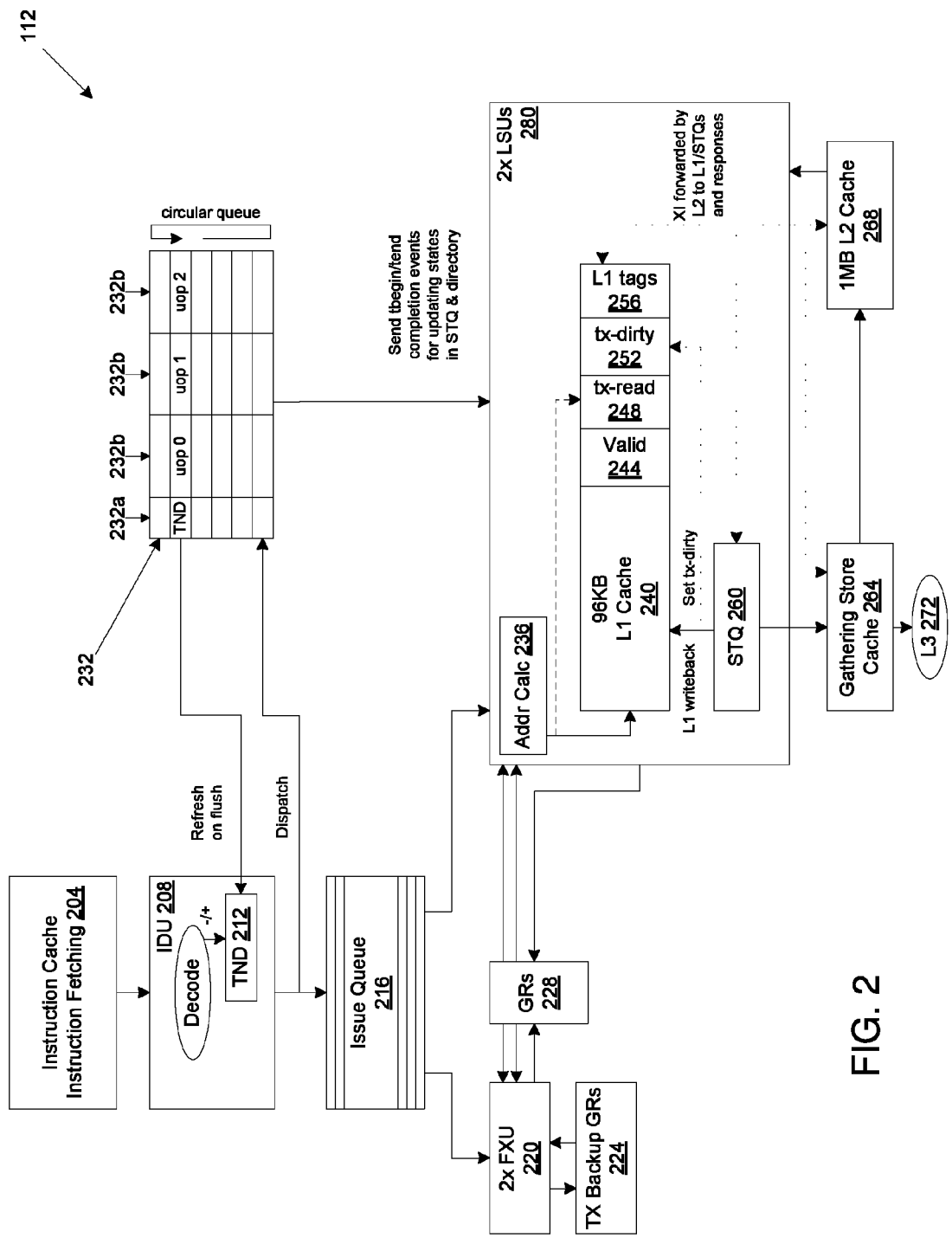
FIG. 2 depicts example components of an example CPU, in accordance with embodiments of the present disclosure.

FIG. 2 shows the details of an example transactional CPU environment 112c, having a CPU 114c, including additions to support TM. The transactional CPU (processor) 114c may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114c while executing a transaction and W bits 138 showing a line has been written-to by the CPU 114c while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
| --- | --- | --- | --- |
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 December 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts a significant burden on the programming and software verification teams, especially where the fallback path is not automatically generated by a reliable compiler.

TABLE 3

Example Transaction Code

| | | | |
|---|---|---|---|
| | LHI | R0,0 | *initialize retry count=0 |
| loop | TBEGIN | | *begin transaction |
| | JNZ | abort | *go to abort code if CC1=0 |
| | LT | R1, lock | *load and test the fallback lock |
| | JNZ | lckbzy | *branch if lock busy |
| | . . . perform operation . . . | | |
| | TEND | | *end transaction |
| | . . . . . . . . . . . . | | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | . . . potentially wait for lock to become free . . . | | |
| | J | loop | *jump back to retry fallback |
| | OBTAIN | lock | *using Compare&Swap |
| | . . . perform operation . . . | | |
| | RELEASE | lock | |
| | . . . . . . . . . . . . | | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114c (FIG. 1) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like)(BEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| . . . perform operation . . . | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

With reference to FIG. 2, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 2 depicts example components of an example transactional execution environment, including a CPU and caches/components with which it interacts (such as those depicted in FIG. 1). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction.

When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114c (FIG. 1) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIG. 1) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114c (FIG. 1) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 1) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

Managing Transactional Aborts

As previously described, events occurring during execution of a transaction may disrupt the transaction and cause the transaction to abort. A disruptive event may be any event that can result in a transactional abort. For example, a disruptive event may be a system event, such as a pending timer interrupt or other pending asynchronous interrupt. For another example, a disruptive event may be a conflict with a second processor, such as when the second processor's activities, such as cache or other memory accesses, interfere with the transaction code region's ability to execute transactionally.

When a processor executing a non-constrained transaction identifies such a disruptive event, the processor has at least two possible actions: (1) the processor may immediately abort the transaction in favor of the disruptive event, and (2) the processor may defer processing of the disruptive event for some period of time and attempt to complete the transaction, thus avoiding the performance loss associated with a transactional abort. Time and resources spent processing a transaction that is eventually aborted are wasted, and if a transaction is aborted too many times, software may need to resort to a course-grained lock or take other drastic measures in order to complete the functions attempted by the transaction. Such drastic measures may result in even further performance losses.

For example, if a processor executing a transaction identifies a pending timer interrupt, the processor may defer processing that timer interrupt in favor of attempting to complete the transaction. For another example, if a processor executing a transaction identifies an incoming cache coherency request involving the transaction's cache footprint, the processor may temporarily refuse to honor the coherency request in favor of attempting to complete the transaction. As previously described, a coherency request may be broadcast from a processor to gain exclusive access to a cache line, such as when the processor needs to write to the cache line, or may result if a snoop of the cache line on a common address request bus reveals an inconsistency with more recent data. In some implementations, a coherency request may be referred to as a cross-interrogate (XI).

Ironically, a processor that defers processing of a disruptive event in favor of attempting to complete a transaction may actually be contributing to a loss in overall system performance. In the examples above, deferring the timer interrupt may degrade system responsiveness, and refusing to honor the coherency request may slow down overall system processing, or in extreme cases may cause a system hang if deferred indefinitely. Furthermore, a processor's attempt to complete a transaction may still eventually fail since disruptive events may not be deferred indefinitely. Time and resources spent on failed attempts to complete a transaction are doubly wasteful; in addition to the resources wasted by continuing to process a doomed transaction, immediate processing of the deferred disruptive event would likely have improved system performance.

In determining whether to defer processing of a disruptive event in favor of attempting to complete a transaction, it would be helpful for the processor to know how close the transaction is to completion. A transaction that is closer to completion may be a good candidate for an attempt to complete the transaction, while a transaction that is further from completion may be a good candidate for an immediate abort in favor of processing the disruptive event.

One way to provide the processor with an estimate of how close the transaction is to completion is to introduce a new type of instruction to the Instruction Set Architecture. This new type of instruction, referred to within this disclosure as a "transaction-hint instruction", provides a hint to the processor of approximately how close the transaction is to completion. The transaction-hint instruction may specify a value indicating how far the transaction is from completion. This value is referred to within this disclosure as a "transaction-count-to-completion" (CTC) value. The specified CTC value is an approximation of how close the transaction is to completion at the time the transaction-hint instruction is executed. As the transaction progresses and more instructions are executed, the processor may periodically adjust the CTC value, for example, the processor may adjust the internal CTC value after each instruction is executed. The adjusted CTC value accounts for the progress of the transaction since execution of the transaction-hint instruction. If the processor identifies a disruptive event while processing the transaction, the processor may use the adjusted CTC value to determine whether to defer processing of the disruptive event or whether to immediately abort the transaction in favor of the disruptive event.

In some embodiments, the CTC value may indicate the approximate number of instructions required to complete the transaction. In some embodiments, the CTC value may indicate the approximate amount of time required to complete the transaction. The transaction-hint instruction may specify the CTC value using zero or more instruction operands; such operands may be immediate values, register locations, memory locations, or a combination of these and other types of operands. A transaction-hint instruction with zero operands may specify the CTC value in another way, for example by an implied association with a particular register and/or memory location upon which the CTC value may be based.

Especially for moderate to complex transactions, for example transactions that include branches, it may be difficult for a transaction-hint instruction to specify a precisely accurate CTC value. Consequently, the CTC value may often be an approximation of the number of instructions required to complete the transaction, or an approximation of the amount of time required to complete the transaction. A programmer or compiler may attempt to provide a CTC value that covers most contingencies through the branch paths of the transaction, may attempt to provide a "worst-case" CTC value that covers the longest path through the transaction, or may provide a CTC value based on some other criteria. For transactions where a CTC value cannot be determined at compile time, such as when transaction code follows a linked list pointer chain, a programmer or compiler may provide a CTC value that is based on an average value determined via experimental execution of the transaction code. For example, the CTC value provided may be an amount of time that is somewhat greater than the average time determined via experimental execution of the transaction code. In some embodiments, software may dynamically determine the time required for individual transactions to complete. Transaction-hint instructions within a previously timed transaction may then base the specified CTC value on that previously determined time. For example, Java code may determine the time required for a transaction to complete before it JITs the code; the JITed code may then contain a CTC value while the interpreted code may not.

Figure 3:
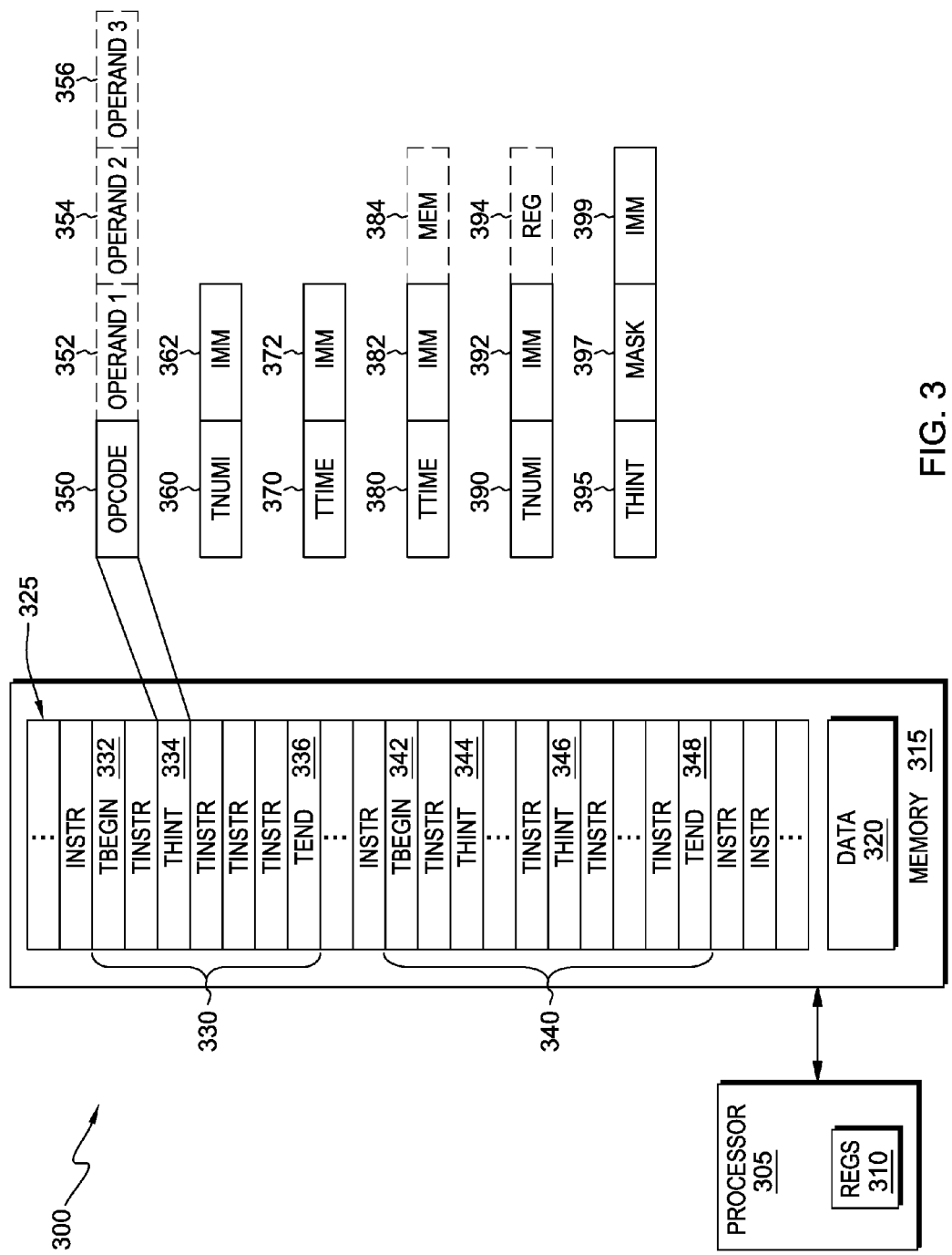
FIG. 3 is a block diagram representing an example system for managing transactional aborts with a transaction-hint instruction, in accordance with embodiments of the present disclosure.

An example system 300 of an embodiment for managing transactional aborts with a transaction-hint instruction is illustrated in FIG. 3. A memory 315 contains instructions 325 for execution by a processor 305. Although instructions 325 are represented as a contiguous block in a single memory 315 in system 300, the format and location of instructions 325 may vary among embodiments.

Within instructions 325 is a first transaction 330. As previously described, a transaction is a programmer-specified code region in which most memory operations within the region appear to have occurred instantaneously upon successful completion. In the embodiment illustrated in system 300, a TBEGIN instruction 332 specifies the start of transaction 330 and a TEND instruction 336 specifies the end of transaction 330.

A programmer has placed a transaction-hint instruction (THINT) 334 within transaction 330. The THINT instruction can be placed anywhere within a transaction, including immediately following a TBEGIN instruction and immediately preceding a TEND instruction. Furthermore, the THINT instruction can be placed outside of a transaction. When a THINT instruction is placed within a transaction, the THINT instruction is associated with that transaction and provides a hint to the processor of approximately how close that transaction is to completion. When a THINT instruction is placed outside of a transaction, the THINT instruction may be associated with, for example, the next transaction. A THINT instruction associated with the next transaction may provide a hint to the processor of approximately how close the next transaction is to completion. Alternatively, a THINT instruction associated with the next transaction may provide a hint to the processor of approximately close the next transaction will be to completion after it begins.

When processor 305 executes THINT instruction 334, it determines a CTC value indicating how close transaction 330 is to completion. In some embodiments, processor 305 may determine the CTC value directly from THINT instruction 334, for example, by inspecting an operand associated with THINT instruction 334 that contains a compile-time constant. In some embodiments, processor 305 may determine the CTC value indirectly from THINT instruction 334, for example, by inspecting a run-time value contained in a register, such as a register from CPU registers 310, or in a particular memory location, such as a memory location in data memory 320. Such register or memory locations may be specified in operands associated with THINT instruction 334. In some embodiments, processor 305 may determine the CTC value based on a combination of compile-time constants and run-time values associated with THINT instruction 334.

As processor 305 continues to execute instructions within transaction 330 after processing THINT instruction 334, the processor adjusts the CTC value based on the progress of the transaction. In some embodiments, processor 305 may load an internal CTC counter with the specified CTC value from THINT instruction 334, and may adjust the CTC value by decrementing the internal CTC counter as instructions are completed. In some embodiments, processor 305 may increment a counter to count instructions as they are completed, and may adjust the CTC value by first determining the difference between the current value of the counter and the value at the time THINT instruction 334 was executed, and then subsequently comparing this determined difference to the specified CTC value from THINT instruction 334.

In some embodiments, processor 305 may use one or more timer constructs to adjust the CTC value. For example, processor 305 may start a timer when THINT instruction 334 is executed, and may adjust the CTC value by subtracting the timer value from the CTC value specified by THINT instruction 334 as instructions are completed. For another example, processor 305 may start a timer when a transaction is started, and may adjust the CTC value by first determining the difference between the current value of the timer and the value of the timer when THINT instruction 334 was executed, and then subsequently comparing this determined difference to the specified CTC value. For another example, processor 305 may load an internal CPU register with the specified CTC value in clock cycles from THINT instruction 334, and may adjust the CTC value by decrementing the internal CPU register as clock cycles elapse.

Various methods and processes for adjusting the CTC value are contemplated, and any and all are appropriate so long as the adjusted CTC value accounts for the progress of the transaction since THINT instruction 334 was executed. Processor 305 may then use a transaction's adjusted CTC value in determining whether to defer processing of a disruptive event in favor of attempting to complete the transaction.

Within instructions 325 is also a second transaction 340. A TBEGIN instruction 342 specifies the start of transaction 340 and a TEND instruction 348 specifies the end of transaction 340. Transaction 340 contains two THINT instructions 344, 346. When processor 305 executes first THINT instruction 344, it determines a CTC value indicating how close transaction 340 is to completion. Processor 305 then adjusts the CTC value as the transaction progresses. When processor 305 executes second THINT instruction 346, it replaces the adjusted CTC value with the CTC value specified by second THINT instruction 346. A programmer may choose to place multiple THINT instructions within a lengthy and/or complex transaction to provide a more accurate approximation of how close the transaction is to completion as the transaction progresses. A THINT instruction placed early in a complex transaction may need to account for a wider range of contingencies than a THINT instruction placed later in the transaction, when some branching and other decisions may have already occurred within the transaction. Consequently, an earlier-executed THINT instruction may be less accurate than a later-executed THINT instruction.

The format of a THINT instruction may include an operation code 350 and zero or more operands. Although system 300 shows an instruction format with three optional operands 352, 354, and 356, some embodiments may provide for exactly one operand, some embodiments may provide for exactly two operands, some embodiments may provide for one mandatory operand and one optional operand, and other embodiments may provide for a different combination of mandatory and optional operands. The operands may be defined as immediate value fields, register designation fields, memory address fields, mask fields, length fields, displacement fields, or any other type of field, depending on the embodiment. Several non-limiting examples of THINT instruction formats follow, and many more are contemplated.

The Instruction Set Architecture (ISA) may include a transaction-hint instruction that specifies a CTC value indicating the approximate number of instructions remaining before the transaction completes. This transaction-instructions-to-completion instruction may have an operation code 360 represented by the mnemonic TNUMI and may require one immediate-value operand 362 specifying the CTC value as a number of instructions. For another example, the ISA may include a transaction-hint instruction that specifies a CTC value indicating the approximate amount of time remaining before the transaction completes. This transaction-time-to-completion instruction may have an operation code 370 represented by the mnemonic TTIME and may require one immediate-value operand 372 specifying the CTC value as a number of clock cycles, picoseconds, nanoseconds, microseconds, or some other representation of time. For another example, a TTIME instruction 380 may require one immediate-value operand 382 specifying a time value, and an optional operand 384 specifying a memory address that contains a dynamically determined time value based on software run-time history. This format would work equally well for a TNUMI instruction. Together, these two time values may specify the CTC value, for example by adding them or subtracting one from the other. For another example, a TNUMI instruction 390 may follow the RXY format in the z/Architecture, allowing for both a compile time constant (immediate value 392) and a dynamically determined value based on software run-time history (register designation field 394). This format would work equally well for a TTIME instruction. For another example, the ISA may include a generic transaction-hint instruction that specifies a CTC value and further specifies whether the CTC value indicates the approximate number of instructions remaining before the transaction completes or the approximate amount of time remaining before the transaction completes. This transaction-hint instruction may have an operation code 395 represented by the mnemonic THINT, may require a mask operand 397 with an indicator flag specifying whether the CTC value represents a number of instructions or an amount of time, and may require one immediate-value operand 399 specifying the CTC value. Example code containing a TNUMI instruction is shown below in Table 5.

TABLE 5

Example Transaction Code

|  | TBEGIN | | |
|---|---|---|---|
|  | BRC | 7, ABORT_HDLR | *Call software abort handler |
|  | TNUMI | 7 (, 0) | *7 remaining instructions in TX |
|  | L | 1, A | *Fetch A and B atomically |
|  | L | 2, B |  |
|  | CLR | 1, 2 | *Compare A and B |
|  | BRE | A_EQ_B | *If A = B, we are done |
|  | ST | 1, B | *Swap A and B atomically |
|  | ST | 2, A |  |
| A_EQ_B | TEND |  | *End TX |

In the Table 5 example, the transaction-hint instruction (TNUMI) specifies a CTC value of 7, indicating that seven instructions remain to be executed in the transaction. Note that if A equals B, there are actually only five instructions remaining, but the programmer has selected a worst-case value of 7 for the CTC value. Also note that an embodiment may include one, both, or neither of the TNUMI and TEND instructions in the specified CTC value. As the processor executes each subsequent instruction, the processor adjusts the CTC value. After the first load (L) instruction, the CTC value is 6. After the second load (L) instruction, the CTC value is 5. If A does not equal B, the CTC value is 3 when the processor starts processing the store (ST) instructions. If the processor then identifies a disruptive event, and if the adjusted CTC value of 3 satisfies deferral criteria, the processor may defer processing the disruptive event until A and B are stored and the transaction is complete. The deferral criteria may be, for example, a predefined threshold number determined by engineering testing for this processor and system environment. Deferral criteria may be hard-coded, directly programmed, obtained through a user interface, determined at run-time, or supplied in some other manner.

Figure 4:
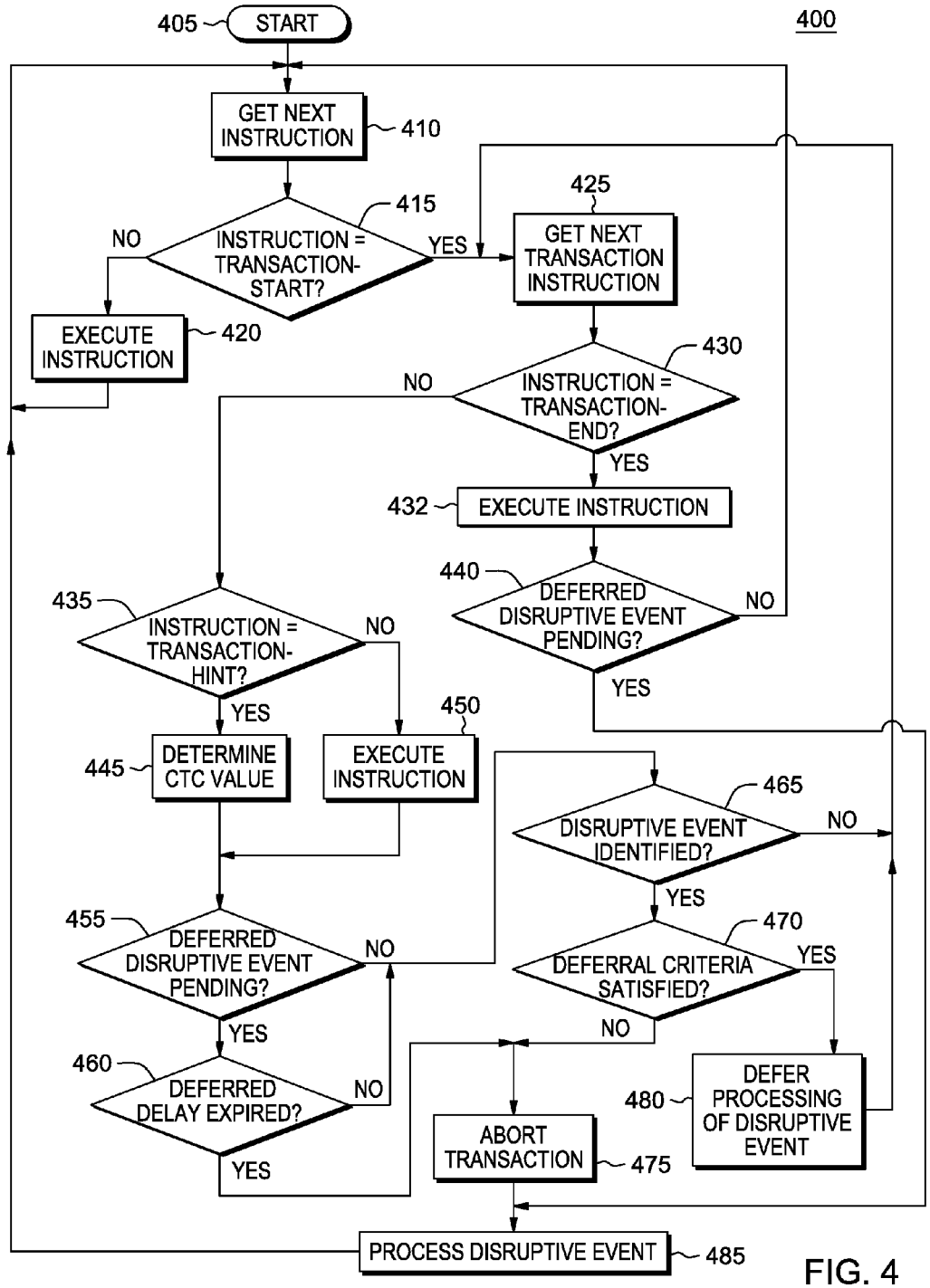
FIG. 4 is a flow diagram illustrating an example method for managing transactional aborts with a transaction-hint instruction, in accordance with embodiments of the present disclosure.

An example method 400 of an embodiment for managing transactional aborts with a transaction-hint instruction is illustrated in FIG. 4. At start 405, the processor may get the next instruction at 410. If the next instruction does not indicate the start of a transactional code region at 415, then the processor may execute or otherwise process the instruction at 420 and return to get the next instruction at 410.

If the next instruction indicates the start of a transactional code region at 415, then the processor may get the next instruction in the transaction at 425. If the next instruction in the transaction indicates the end of the transactional code region at 430, then the instruction is executed at 432, the atomic commit is successful, and the transaction is complete. If the next instruction in the transaction does not indicate the end of the transactional code region at 430, then the processor may determine whether the instruction is a transaction-hint instruction at 435. If the instruction is not a transaction-hint instruction at 435, then the processor may execute or otherwise process the instruction at 450. If the instruction is a transaction-hint instruction at 435, then the processor may execute or otherwise process the transaction-hint instruction to determine the CTC value at 445.

Whether or not the instruction is a transaction-hint instruction at 435, after executing the instruction at 445 or 450, the processor may determine whether a previously deferred disruptive event is pending at 455. Although in method 400 the processor checks for a pending deferred disruptive event after each instruction in the transaction is executed, in some embodiments the processor may check more frequently or less frequently. The processor may also determine whether a previously deferred disruptive event is pending at 440 after the transaction is complete at 432. If a deferred disruptive event is pending at 440, after the transaction is complete, then the processor may process the deferred disruptive event at 485 and return to get the next instruction at 410. If a deferred disruptive event is not pending at 440, the processor may return to get the next instruction at 410. Although method 400 shows instruction execution at 450, in some embodiments, instruction execution may be postponed until after deferment is evaluated, for example after 455, 460, 465, or 470.

If a deferred disruptive event is pending at 455, before the transaction is complete, then the processor may determine whether a deferral delay has expired at 460. The deferral delay may represent the longest deferral allowed in the environment, and may prevent a disruptive event from being deferred for too long. The deferral delay may be defined as a number of instructions, as a length of time, or in some other manner. The deferral delay may be, for example, a predefined threshold number of instructions or a predetermined number of clock cycles determined by engineering testing. The deferral delay may be hard-coded, directly programmed, obtained through a user interface, determined at run-time, or supplied in some other manner. Determining whether the deferral delay has expired may be accomplished through polling, interrupt handling, or in some other manner.

A deferral delay may be useful in dealing with malevolent software where a programmer inserts one or more transaction-hint instructions into a transaction that specify artificially low CTC values, for example in an attempt to defer aborts indefinitely. Expiration of a deferral delay may cause the processor to process a deferred disruptive event regardless of the adjusted CTC value. Some embodiments may implement other ways of dealing with malevolent software, for example by ignoring additional transaction-hint instructions whenever a deferred disruptive event is pending, or by aborting the transaction and processing a deferred disruptive event whenever a transaction's adjusted CTC value reaches zero prematurely.

If a deferral delay has expired at 460, then the processor may abort the transaction at 475, process the deferred disruptive event at 485, and return to get the next instruction at 410. In some embodiments, the next instruction may indicate the start of a retry of the transaction aborted at 475. Although method 400 presents the handling of an expired deferral delay as occurring only between execution of instructions at 460, in some embodiments, expired deferral delay handling may occur at any time, for example during execution of an instruction. The timing associated with handling expired deferral delays is implementation-specific.

If no deferral delay has expired at 460, or if a deferred disruptive event is not pending at 455, then the processor may determine whether a disruptive event has been identified at 465. Although method 400 presents the handling of a disruptive event identification as occurring only between execution of individual instructions at 465, in some embodiments, disruptive event identification handling may occur at any time, for example during execution of an instruction. The timing associated with handling disruptive event identifications is implementation-specific. Furthermore, the types of disruptive events identified at 465 may vary according to the specific embodiment. For example, a processor may be associated with two types of asynchronous interrupts: architected (ISA) and micro-architected. Architected interrupts may include I/O interrupts and timer interrupts. Micro-architected interrupts may not be visible to software but may interrupt processor firmware. One, both, or neither of architected and micro-architected interrupts may be identified at 465, depending on the implementation.

If a disruptive event is not identified at 465, then the processor may return to get the next instruction in the transaction at 425. If a disruptive event is identified at 465, then the processor may determine whether criteria are satisfied for deferring the disruptive event at 470. Deferral criteria may be relatively simple, such as a threshold for an adjusted CTC value. As previously discussed, the processor may periodically adjust the CTC value as the transaction progresses, so that an internal adjusted CTC value represents an approximation of how close the transaction is to completion at the time a disruptive event is identified. The method and timing of CTC adjustment may vary among embodiments. An instruction-based CTC value may be decremented after each instruction is completed. In some embodiments, for example where superscalar execution may provide for the completion of multiple instructions at the same cycle, an instruction-based CTC value may be decreased by the number of instructions completed since the last CTC update. Furthermore, note that the term "execution" as used within this disclosure, when referring to the execution of instructions, refers to the completion of instructions. In some embodiments, for example those supporting out-of-order or speculative execution, more instructions may be technically executed than are actually completed.

Transactions with an adjusted CTC value below the threshold may be considered close enough to completion to warrant deferral of the disruptive event at 470, while transactions with an adjusted CTC value above the threshold may considered too far from completion to warrant deferral of the disruptive event. Deferral criteria may be more complex, and may include different thresholds based on different types of disruptive events. For example, transactions with an adjusted CTC value below an interrupt threshold may warrant deferral of a pending interrupt, while transactions with the same adjusted CTC value may not warrant deferral of a conflicting memory access. Deferral criteria may also include a limit on the number of deferred disruptive events that may be pending simultaneously. For example, a first disruptive event identified while processing a transaction may be deferred, but a second disruptive event may result in a transactional abort.

If the deferral criteria are satisfied at 470, then the processor may defer processing of the disruptive event at 480 and return to get the next instruction in the transaction at 425. If the deferral criteria are not satisfied at 470, then the processor may abort the transaction at 475, process the disruptive event at 485, and return to get the next instruction at 410. In some embodiments, the next instruction may indicate the start of a retry of the transaction aborted at 475.

Figure 5:
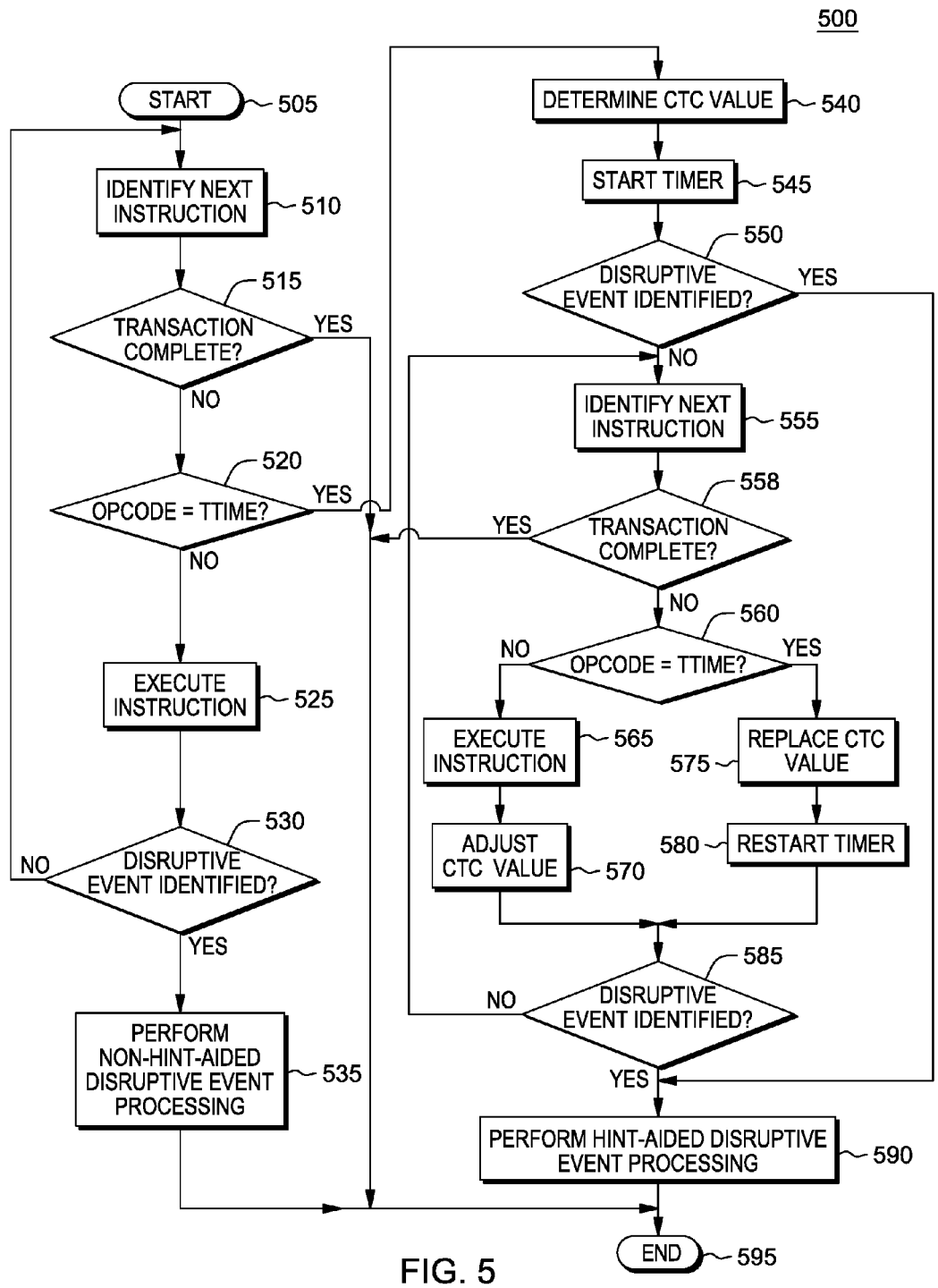
FIG. 5 is a flow diagram illustrating an example method for processing time-to-completion transaction-hint instructions within a transaction, in accordance with embodiments of the present disclosure.

An example method 500 of an embodiment for processing time-to-completion transaction-hint instructions within a transaction is illustrated in FIG. 5. A processor may begin processing a transaction at 505, for example by executing a TBEGIN or similar instruction identifying the start of the transaction. The processor may then identify the next instruction in the transaction at 510. If the next instruction indicates that the transaction is complete at 515, for example if the next instruction is a TEND instruction, then the processor may execute the instruction and end processing of the transaction at 595 without ever executing a transaction-hint instruction and without ever identifying a disruptive event during processing of the transaction.

If the transaction is not complete at 515, and if the instruction's operation code indicates that the instruction is not a time-to-completion (TTIME) transaction-hint instruction at 520, then the processor may execute or otherwise process the instruction at 525. The processor may then determine whether a disruptive event has been identified at 530. Although method 500 describes the handling of a disruptive event identification as occurring only between execution of individual instructions at 530, 550, and 585, in some embodiments, disruptive event identification handling may occur at any time, for example during execution of an instruction. The timing associated with handling disruptive event identifications is implementation-specific.

If a disruptive event is not identified at 530, then the processor may get the next instruction in the transaction at 510. If a disruptive event is identified at 530, then the processor may perform non-hint-aided processing of the disruptive event at 535 and may end processing of the transaction at 595. Non-hint-aided processing of the disruptive event may not necessarily be a transactional abort followed by immediate processing of the disruptive event. Since no transaction-hint instruction has been executed at this point in the transaction processing, the processor follows a non-hint-aided protocol without the benefit of a CTC value providing an approximation of how close the transaction is to completion. The non-hint-aided protocol may or may not include a deferral of the disruptive event in conjunction with an attempt to complete the transaction, including executing one or more additional instructions within the transaction. The non-hint-aided protocol may or may not include a transactional abort. In some embodiments, if following a non-hint-aided protocol includes executing additional instructions within the transaction, executing a future TTIME instruction may cause the processor to switch to a hint-aided protocol.

If the instruction's operation code indicates that the instruction is a TTIME instruction at 520, then the processor may execute or otherwise process the TTIME instruction to determine the CTC value at 540. For method 500, the CTC value is the approximate amount of time remaining to complete the transaction. The processor may then start a timer at 545 for use in adjusting the CTC value as the transaction progresses. In some embodiments, the processor may note the value of an existing timer rather than starting a timer, or may use some other method for tracking the progress of time.

The processor may then determine whether a disruptive event has been identified at 550. If a disruptive event is not identified at 550, then the processor may identify the next instruction in the transaction at 555. If a disruptive event is identified at 550, then the processor may perform hint-aided processing of the disruptive event at 590 and may end processing of the transaction at 595. Hint-aided processing of the disruptive event may not necessarily be a deferral of the disruptive event followed by continued processing of the transaction. Hint-aided processing of the disruptive event may include adjusting the CTC value based on progress of the transaction, determining whether deferral criteria are satisfied based on the adjusted CTC value, and determining whether a deferral delay has expired. Since a transaction-hint instruction has been executed at this point in the transaction processing, the processor follows a hint-aided protocol having the benefit of a CTC value providing an approximation of how close the transaction is to completion. The hint-aided protocol may or may not include a deferral of the disruptive event in conjunction with an attempt to complete the transaction, including executing one or more additional instructions within the transaction. The hint-aided protocol may or may not include a transactional abort. In some embodiments, the hint-aided protocol may ignore future TTIME instructions if continuing to process instructions within the transaction.

If the next instruction in the transaction identified at 555 indicates that the transaction is complete at 558, then the processor may end processing of the transaction at 595 without identifying a disruptive event, and therefore without using the CTC value specified by the TTIME instruction to perform hint-aided disruptive event processing. If the transaction is not complete at 558, and if the next instruction in the transaction identified at 555 is not another TTIME instruction at 560, then the processor may execute or otherwise process the next instruction at 565 and may adjust the CTC value at 570 to account for the time spent processing the transaction at 565. In some embodiments, the CTC value may not be adjusted to account for the progress of the transaction until a disruptive event is identified.

If the next instruction in the transaction identified at 555 is another TTIME instruction at 560, then the processor may execute or otherwise process the new TTIME instruction to replace the existing CTC value with a new CTC value specified by the TTIME instruction at 575, and may then restart the timer at 580 for use in adjusting the new CTC value as the transaction progresses. In some embodiments, the processor may note the current value of an existing timer rather than restarting the timer, or may use some other method for tracking the progress of time from this point in the transaction. This new CTC value may be a more accurate approximation of the time remaining to complete the transaction.

The processor may then determine whether a disruptive event has been identified at 585. If a disruptive event is not identified at 585, then the processor may identify the next instruction in the transaction at 555. If a disruptive event is identified at 585, then the processor may perform hint-aided processing of the disruptive event at 590, and may end processing of the transaction at 595.

Figure 6:
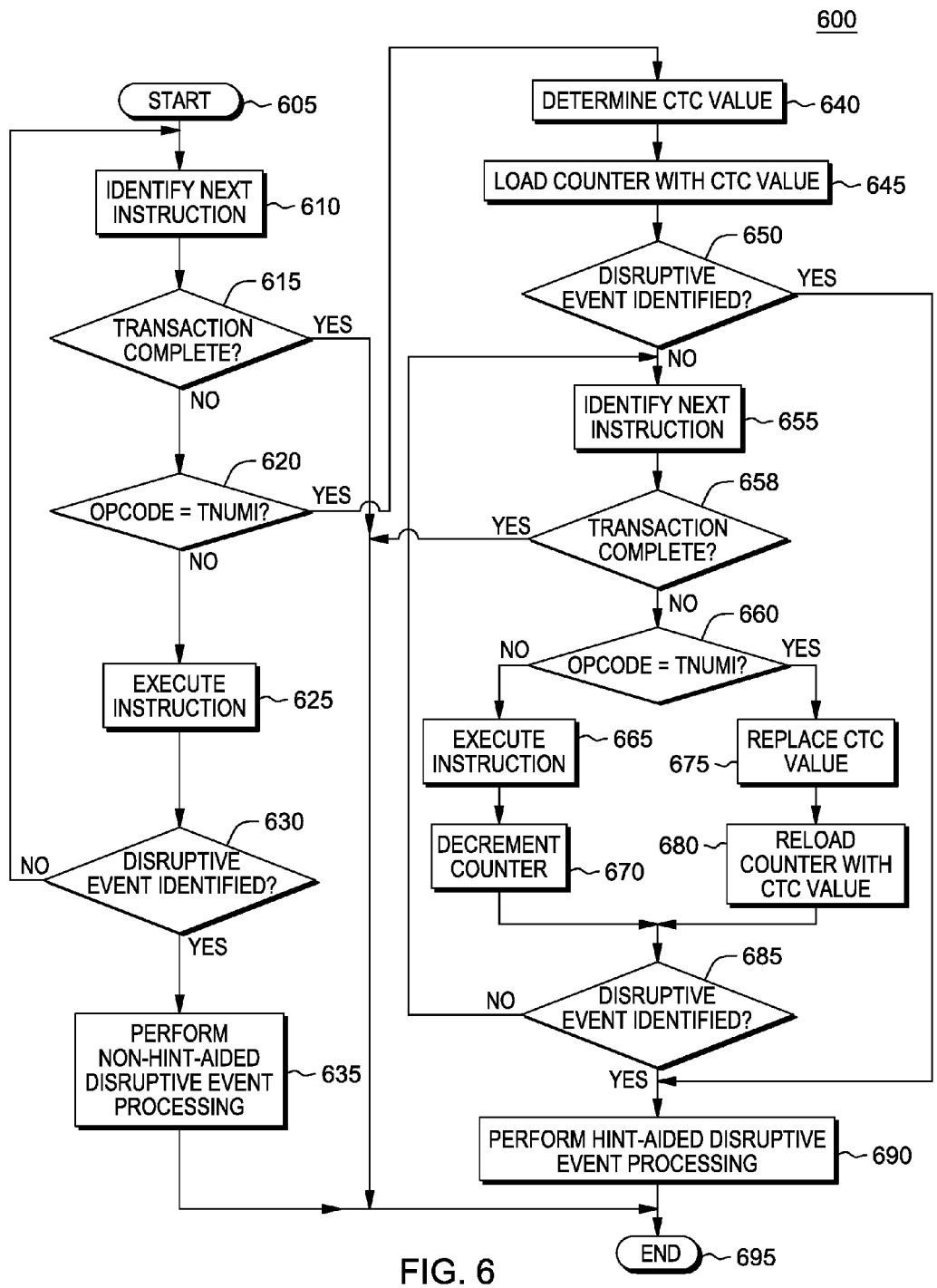
FIG. 6 is a flow diagram illustrating an example method for processing instructions-to-completion transaction-hint instructions within a transaction, in accordance with embodiments of the present disclosure.

An example method 600 of an embodiment for processing instructions-to-completion transaction-hint instructions within a transaction is illustrated in FIG. 6. A processor may begin processing a transaction at 605, for example by executing a TBEGIN or similar instruction identifying the start of the transaction. The processor may then identify the next instruction in the transaction at 610. If the next instruction indicates that the transaction is complete at 615, for example if the next instruction is a TEND instruction, then the processor may execute the instruction and end processing of the transaction at 695 without ever executing a transaction-hint instruction and without ever identifying a disruptive event during processing of the transaction.

If the transaction is not complete at 615, and if the instruction's operation code indicates that the instruction is not an instructions-to-completion (TNUMI) transaction-hint instruction at 620, then the processor may execute or otherwise process the instruction at 625. The processor may then determine whether a disruptive event has been identified at 630. Although method 600 describes the handling of a disruptive event identification as occurring only between execution of individual instructions at 630, 650, and 685, in some embodiments, disruptive event identification handling may occur at any time, for example during execution of an instruction. The timing associated with handling disruptive event identifications is implementation-specific.

If a disruptive event is not identified at 630, then the processor may get the next instruction in the transaction at 610. If a disruptive event is identified at 630, then the processor may perform non-hint-aided processing of the disruptive event at 635 and may end processing of the transaction at 695. Non-hint-aided processing of the disruptive event may not necessarily be a transactional abort followed by immediate processing of the disruptive event. Since no transaction-hint instruction has been executed at this point in the transaction processing, the processor follows a non-hint-aided protocol without the benefit of a CTC value providing an approximation of how close the transaction is to completion. The non-hint-aided protocol may or may not include a deferral of the disruptive event in conjunction with an attempt to complete the transaction, including executing one or more additional instructions within the transaction. The non-hint-aided protocol may or may not include a transactional abort. In some embodiments, if following a non-hint-aided protocol includes executing additional instructions within the transaction, executing a future TNUMI instruction may cause the processor to switch to a hint-aided protocol.

If the instruction's operation code indicates that the instruction is a TNUMI instruction at 620, then the processor may execute or otherwise process the TNUMI instruction to determine the CTC value at 640. For method 600, the CTC value is the approximate number of instructions remaining to complete the transaction. The processor may then load an instruction counter with the CTC value at 645. In some embodiments, the processor may note the value of an existing instruction counter rather than loading a new counter, or may use some other method for tracking execution of instructions within the transaction.

The processor may then determine whether a disruptive event has been identified at 650. If a disruptive event is not identified at 650, then the processor may identify the next instruction in the transaction at 655. If a disruptive event is identified at 650, then the processor may perform hint-aided processing of the disruptive event at 690 and may end processing of the transaction at 695. Hint-aided processing of the disruptive event may not necessarily be a deferral of the disruptive event followed by continued processing of the transaction. Hint-aided processing of the disruptive event may include adjusting the CTC value based on progress of the transaction, determining whether deferral criteria are satisfied based on the adjusted CTC value, and determining whether a deferral delay has expired. Since a transaction-hint instruction has been executed at this point in the transaction processing, the processor follows a hint-aided protocol having the benefit of a CTC value providing an approximation of how close the transaction is to completion. The hint-aided protocol may or may not include a deferral of the disruptive event in conjunction with an attempt to complete the transaction, including executing one or more additional instructions within the transaction. The hint-aided protocol may or may not include a transactional abort. In some embodiments, the hint-aided protocol may ignore future TNUMI instructions if continuing to process instructions within the transaction.

If the next instruction in the transaction identified at 655 indicates that the transaction is complete at 658, then the processor may end processing of the transaction at 695 without identifying a disruptive event, and therefore without using the CTC value specified by the TNUMI instruction to perform hint-aided disruptive event processing. If the transaction is not complete at 658, and if the next instruction in the transaction identified at 655 is not another TNUMI instruction at 660, then the processor may execute or otherwise process the next instruction at 665 and may adjust the CTC value by decrementing the counter at 670 to account for the instruction processed at 665. In some embodiments, the CTC value may not be adjusted to account for the progress of the transaction until a disruptive event is identified.

If the next instruction in the transaction identified at 655 is another TNUMI instruction at 660, then the processor may execute or otherwise process the new TNUMI instruction to replace the existing CTC value with a new CTC value specified by the TNUMI instruction at 675, and may then reload the instruction counter with the new CTC value at 680. In some embodiments, the processor may note the current value of an existing instruction counter rather than reloading the new instruction counter, or may use some other method for tracking the execution of instructions from this point in the transaction. This new CTC value may be a more accurate approximation of the number of instruction remaining to complete the transaction.

The processor may then determine whether a disruptive event has been identified at 685. If a disruptive event is not identified at 685, then the processor may identify the next instruction in the transaction at 655. If a disruptive event is identified at 685, then the processor may perform hint-aided processing of the disruptive event at 690, and may end processing of the transaction at 695.

Figure 7:
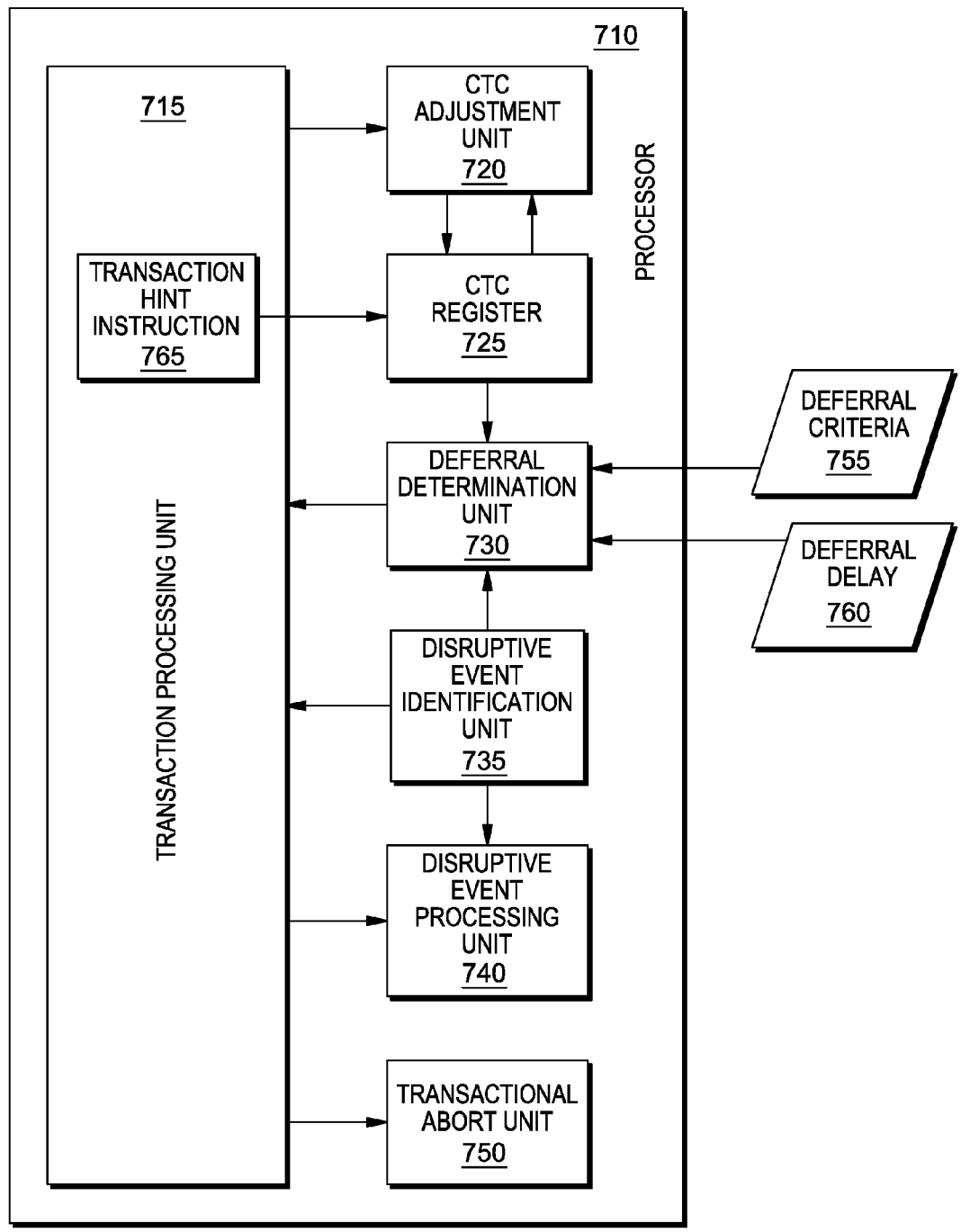
FIG. 7 is a block diagram illustrating an example system for managing transactional aborts with a transaction-hint instruction, in accordance with embodiments of the present disclosure.

An example system 700 of an embodiment for managing transactional aborts with a transaction-hint instruction is illustrated in FIG. 7. Although system 700 is illustrated as a number of discrete units performing a number of defined functions, any of these defined functions may be implemented using more, fewer, or different discrete units than those shown in system 700.

Within processor 710, a transaction processing unit 715 may process a transaction-hint instruction 765, which loads a register 725 with a CTC value. CTC adjustment unit 720 receives information from transaction processing unit 715 about the progress of the transaction, and uses this progress information along with the value of CTC register 725 to adjust the CTC value and update CTC register 725. For example, CTC adjustment unit 720 may be a decrementing unit which decrements CTC register 725 each time transaction processing unit 715 executes an instruction.

Disruptive event identification unit 735 notifies transaction processing unit 715, disruptive event processing unit 740, and deferral determination unit 730 whenever a disruptive event occurs during processing of the transaction. Deferral determination unit 730 then determines whether the value in CTC register 725 satisfies deferral criteria 755. If deferral criteria 755 is not satisfied, deferral determination unit 730 notifies transaction processing unit 715 to abort the transaction and process the disruptive event. If deferral criteria 755 is satisfied, deferral determination unit 730 notifies transaction processing unit 715 to defer processing the disruptive event and attempt to complete the transaction. Deferral determination unit 730 may also notify transaction processing unit 715 to abort the transaction and process a disruptive event if the disruptive event has been deferred for longer than the deferral delay 760. Whenever transaction processing unit 715 is notified to abort a transaction, it notifies transactional abort unit 750. Whenever transaction processing unit 715 is notified to process a disruptive event, it notifies disruptive event processing unit 740.

Note that all instruction mnemonics used within this disclosure, such as TBEGIN, TEND, THINT, TNUMI, and TTIME, are selected for brevity of reference and clarity of meaning and carry no special significance; any mnemonic could be selected to represent instructions or other entities in the disclosed computing environments.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more of the capabilities of the present disclosure can be implemented in software, firmware, hardware, or some combination thereof. Further, one or more of the capabilities can be emulated. For example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments of the present disclosure, even though a computer executing the emulator may have a different architecture than the capabilities being emulated.

As one example, in emulation mode, the specific instruction or operation being emulated is decoded, and an appropriate emulation function is built to implement the individual instruction or operation.

Figure 8:
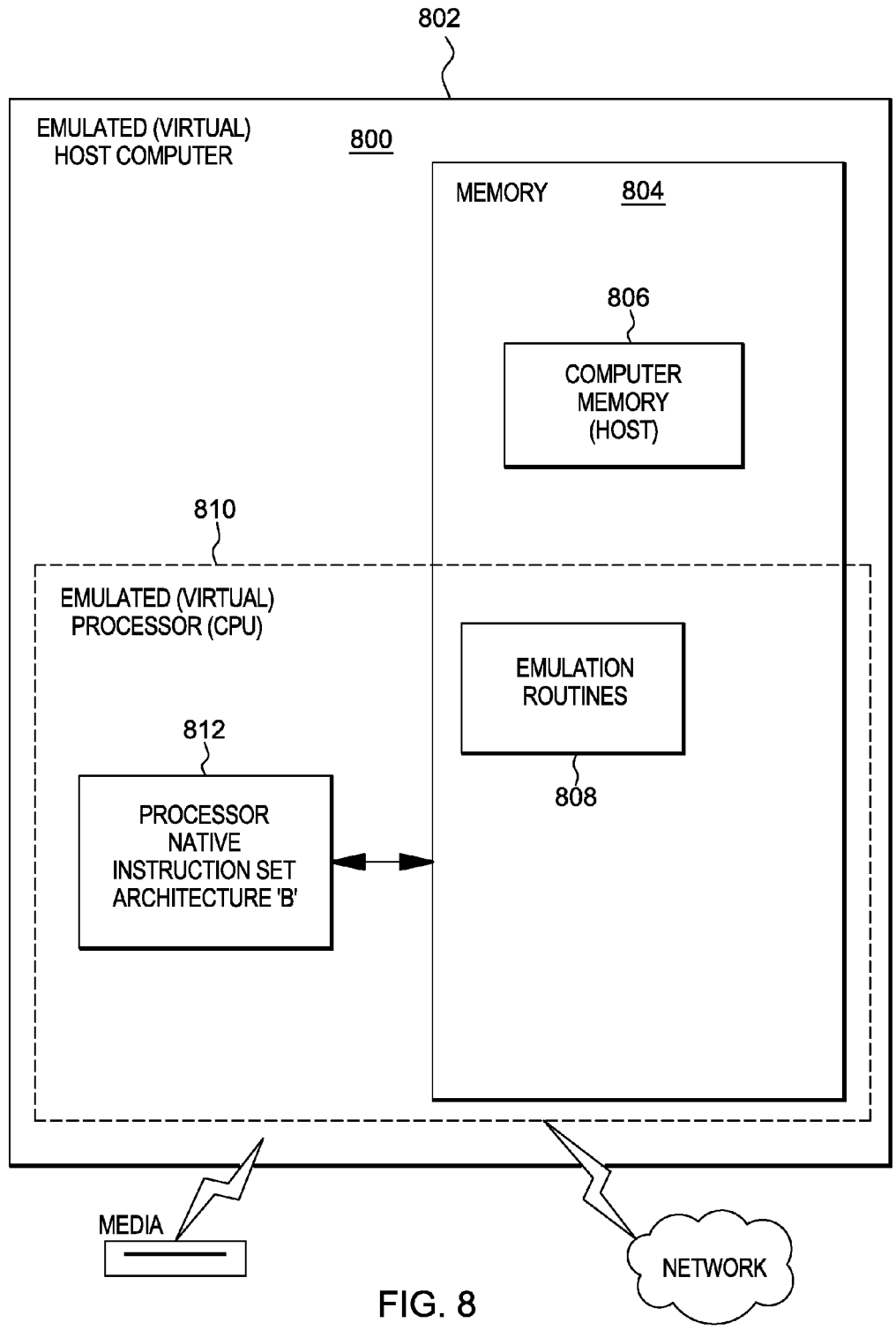
FIG. 8 is a block diagram of an example emulated host computer system for managing transactional aborts with a transaction-hint instruction, in accordance with embodiments of the present disclosure.

In FIG. 8, an example of an emulated host computer system 802 is provided that emulates a host computer system 800 of a host architecture. In the emulated host computer system 802, the host processor (CPU) 810 is an emulated host processor (or virtual host processor) and comprises an emulation processor 812 having a different native instruction set architecture than that of the processor 810 of the host computer 800. The emulated host computer system 802 has memory 804 accessible to the emulation processor 812. In the example embodiment, the memory 804 is partitioned into a host computer memory 806 portion and an emulation routines 808 portion. The host computer memory 806 is available to programs of the emulated host computer 802 according to host computer architecture. The emulation processor 812 executes native instructions of an architected instruction set of an architecture other than that of the emulated processor 810, the native instructions obtained from emulation routines memory 808, and may access a host instruction for execution from a program in host computer memory 806 by employing one or more instructions obtained in a sequence & access/decode routine which may decode the host instruction(s) accessed to determine a native instruction execution routine for emulating the function of the host instruction accessed. Other facilities that are defined for the host computer system 800 architecture may be emulated by architected facilities routines, including such facilities as general purpose registers, control registers, dynamic address translation and I/O subsystem support and processor cache, for example. The emulation routines may also take advantage of functions available in the emulation processor 812 (such as general registers and dynamic translation of virtual addresses) to improve performance of the emulation routines. Special hardware and off-load engines may also be provided to assist the processor 812 in emulating the function of the host computer 800.

Figure 9:
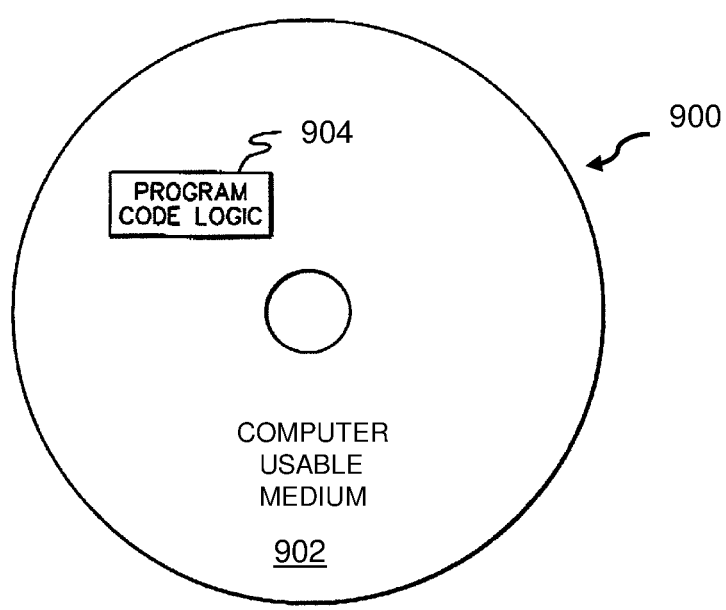
FIG. 9 is a block diagram of an example computer program product for managing transactional aborts with a transaction-hint instruction, in accordance with embodiments of the present disclosure.

One or more aspects of the present disclosure can be included in an article of manufacture 900 (e.g., one or more computer program products) having, for instance, computer readable storage media 902 as shown in FIG. 9. The media has embodied therein, for instance, computer readable program code (instructions) 904 to provide and facilitate the capabilities of the present disclosure. The article of manufacture 900 can be included as a part of a computer system or as a separate product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although one or more examples have been provided herein, these are only examples. Many variations are possible without departing from the spirit of the present disclosure. For instance, processing environments other than the examples provided herein may include and/or benefit from one or more aspects of the present disclosure. Further, the environment need not be based on the z/Architecture®, but instead can be based on other architectures offered by, for instance, IBM®, Intel®, Oracle®, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for processing transactions in a computing environment with transactional memory, the method comprising:

executing, by a processor, a transaction-hint instruction associated with a first transaction, the transaction-hint instruction specifying a transaction-count-to-completion (CTC) value, the CTC value indicating how far the first transaction is from completion;

adjusting, by the processor, the CTC value based on progress of the first transaction;

identifying, by the processor, a disruptive event while processing the first transaction, the disruptive event associated with inducing transactional aborts;

determining, by the processor, whether the adjusted CTC value satisfies deferral criteria; and aborting, based on determining that the adjusted CTC value does not satisfy the deferral criteria, processing of the first transaction.

2. The method of claim 1, wherein the transaction-hint instruction is selected from the group consisting of:

an instructions-to-completion instruction, wherein the CTC value indicates an approximate number of instructions remaining to complete the first transaction;

a transaction-time-to-completion instruction, wherein the CTC value indicates an approximate amount of time remaining to complete the first transaction; and a generic transaction-hint instruction, wherein an indicator flag in a mask field associated with the generic transaction-hint instruction determines whether the CTC value indicates an approximate number of instructions remaining to complete the first transaction or an approximate amount of time remaining to complete the first transaction.

3. The method of claim 1, wherein the disruptive event is selected from the group consisting of:

a pending asynchronous interrupt; and a conflicting memory access between the first transaction and a second processor.

4. The method of claim 1, wherein the adjusted CTC value does not satisfy the deferral criteria based on the adjusted CTC value and a predetermined threshold value.

5. The method of claim 1, wherein the specified CTC value is based on at least one of an immediate value associated with the transaction-hint instruction, a register identifier associated with the transaction-hint instruction, and a memory address associated with the transaction-hint instruction.

6. The method of claim 1, wherein the method further comprises:

executing a second transaction-hint instruction associated with the first transaction; and adjusting the CTC value based on the executing the second transaction-hint instruction.

7. The method of claim 1, wherein the transaction-hint instruction is executed before the processing of the first transaction begins.

8. The method of claim 1, the method further comprising:

executing a second transaction-hint instruction associated with a second transaction, the second transaction-hint instruction specifying a second CTC value for the second transaction;

deferring processing of a second disruptive event for the second transaction in response to determining that the second CTC value satisfies a second deferral criteria;

determining, after deferring processing of the second disruptive event, whether a predetermined deferral delay for the second transaction has expired before a completion of the second transaction; and based on determining that the predetermined deferral delay has expired before the completion of the second transaction, aborting the second transaction.

9. The method of claim 1, wherein the adjusting, by the processor, the CTC value based on progress of the first transaction comprises:
loading an internal CTC counter with the specified CTC value;
decrementing the CTC counter each time an instruction is completed; and
setting the CTC value equal to the CTC counter.

10. The method of claim 1, wherein the adjusting, by the processor, the CTC value based on progress of the first transaction comprises:
loading an internal CTC counter at the beginning of the transaction;
incrementing the CTC counter each time an instruction is completed; and
determining the adjusted CTC value by subtracting the value of the CTC counter from the CTC value specified in the transaction-hint instruction.

11. The method of claim 1, wherein the adjusted CTC value is based on a combination of compile-time constants and run-time values associated with the transaction-hint instruction.

12. The method of claim 1, wherein the adjusting, by the processor, the CTC value based on progress of the first transaction comprises:
starting a timer when the transaction-hint instruction is executed; and
subtracting a timer value from the specified CTC value.

13. The method of claim 1, wherein the adjusting, by the processor, the CTC value based on progress of the first transaction comprises:
loading an internal CPU register with the specified CTC value, wherein the specified CTC value is in clock cycles; and
decrementing the internal CPU register as clock cycles elapse.

14. The method of claim 1, wherein the specified CTC value is based on a longest path through the transaction.

15. The method of claim 1, wherein the specified CTC value is based on an average value determined via experimental execution of the transaction.

16. The method of claim 1, wherein the adjusting the CTC value is performed periodically.

17. The method of claim 16, wherein the executing the transaction-hint instruction causes the processor to store the specified CTC value in a memory.

18. The method of claim 1, wherein the transaction-hint instruction specifies the CTC value using one or more instruction operands, the one or more instruction operations being selected from a group consisting of an immediate value, a register location, and a memory location.

19. A method for processing transactions in a computing environment with transactional memory, the method comprising:
executing, by a processor, a transaction-hint instruction associated with a first transaction, the transaction-hint instruction specifying an initial transaction-count-to-completion (CTC) value, the initial CTC value indicating a number of instructions in the first transaction, wherein executing the transaction-hint instruction causes the processor to store the initial CTC value in an internal register;
adjusting, in response to an instruction in the first transaction completing after the execution of the transaction-hint instruction, the CTC value in the register;
identifying, by the processor, a disruptive event while processing the first transaction, the disruptive event associated with inducing transactional aborts;
determining, by the processor, whether the adjusted CTC value satisfies deferral criteria and
aborting, based on determining that the adjusted CTC value does not satisfy the deferral criteria, processing of the first transaction.

20. A method for processing transactions in a computing environment with transactional memory, the method comprising:
executing, by a processor, a transaction-hint instruction associated with a first transaction, the transaction-hint instruction specifying an initial transaction-count-to-completion (CTC) value, wherein executing the transaction-hint instruction causes the processor to store the initial CTC value in an internal register;
adjusting, after executing the transaction-hint instruction, the CTC value in the register based on progress of the first transaction, wherein the CTC value is adjusted periodically during processing of the first transaction;
identifying a disruptive event while processing the first transaction, the disruptive event being associated with inducing transactional aborts;
determining whether the adjusted CTC value satisfies deferral criteria; and
aborting, based on determining that the adjusted CTC value does not satisfy the deferral criteria, processing of the first transaction.

* * * * *